United States Patent
McDonough et al.

(10) Patent No.: US 10,649,800 B2
(45) Date of Patent: May 12, 2020

(54) DECREASING TIME TO DEPLOY A VIRTUAL MACHINE

(71) Applicant: VMware, Inc., Palo Alto, CA (US)

(72) Inventors: Michael McDonough, Randolph, NJ (US); Mornay Van Der Walt, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 160 days.

(21) Appl. No.: 14/676,332

(22) Filed: Apr. 1, 2015

(65) Prior Publication Data

US 2016/0055022 A1 Feb. 25, 2016

Related U.S. Application Data

(60) Provisional application No. 62/040,742, filed on Aug. 22, 2014, provisional application No. 62/040,758, (Continued)

(51) Int. Cl.
*G06F 9/455* (2018.01)
*G06F 8/60* (2018.01)
(Continued)

(52) U.S. Cl.
CPC ............ *G06F 9/45558* (2013.01); *G06F 8/60* (2013.01); *G06F 8/65* (2013.01); *G06F 8/70* (2013.01);
(Continued)

(58) Field of Classification Search
CPC .... G06F 3/0481; G06F 3/04842; G06F 9/455; G06F 9/45558; G06F 2009/45562;
(Continued)

(56) References Cited

U.S. PATENT DOCUMENTS

| | | | |
|---|---|---|---|
| 9,251,033 B2* | 2/2016 | Kirchhofer | G06F 9/5083 |
| 2006/0190408 A1* | 8/2006 | Cook | G06Q 30/06 |
| | | | 705/59 |

(Continued)

OTHER PUBLICATIONS

Scott Lowe, CIOs: Pay Attention to the Growing Trends of Commoditization and Hyper-convergence, Dec. 5, 2012, Online "http://wikibon.org/wiki/v/CIOs:Pay_Attention_To_The_Growing_Trends_Of_Commoditization_And_Hyper-convergence".*

(Continued)

*Primary Examiner* — Meng Ai T An
*Assistant Examiner* — Willy W Huaracha

(57) ABSTRACT

In a computer-implemented method for decreasing time to deploy a virtual machine hosted by pre-configured hyper-converged computing device for supporting a virtualization infrastructure, instructions are provided to display a single end-user license agreement (EULA) to enable execution of software on the pre-configured hyper-converged computing device upon acceptance of the single EULA. Acceptance of the single EULA by a user is received. In response to the acceptance of the single EULA, a first virtual machine is deployed in a virtualization infrastructure supported by the pre-configured hyper-converged computing device such that the first virtual machine is deployed in a first time frame rather than a longer second time frame that includes accepting a plurality of EULAs.

6 Claims, 15 Drawing Sheets

Related U.S. Application Data filed on Aug. 22, 2014, provisional application No. 62/040,731, filed on Aug. 22, 2014.

(51) Int. Cl.
*G06F 8/65* (2018.01)
*G06F 8/70* (2018.01)
*G06F 11/36* (2006.01)
*G06Q 40/04* (2012.01)

(52) U.S. Cl.
CPC ......... *G06F 11/3688* (2013.01); *G06Q 40/04* (2013.01); *G06F 2009/4557* (2013.01)

(58) Field of Classification Search
CPC .............. G06F 8/60; G06F 11/3688; G06F 2009/4557; G06F 8/70; G06F 8/65; H04L 41/0803; H04L 41/22; H04L 41/50; H04L 67/1097; G06Q 40/04
USPC ............................................ 718/1
See application file for complete search history.

(56) References Cited

U.S. PATENT DOCUMENTS

| | | |
|---|---|---|
| 2007/0234316 A1 | 10/2007 | Bayerlein |
| 2008/0151766 A1* | 6/2008 | Khasnabish ........ H04L 43/0876 370/252 |
| 2009/0279549 A1* | 11/2009 | Ramanathan ............. G06F 8/65 370/395.4 |
| 2010/0205594 A1 | 8/2010 | Jirka |
| 2011/0022828 A1 | 1/2011 | Delaney et al. |
| 2011/0119479 A1* | 5/2011 | Cowie .................... G06Q 10/06 713/100 |
| 2013/0024659 A1 | 1/2013 | Farrell et al. |
| 2013/0067598 A1* | 3/2013 | Da Palma ............. G06F 21/121 726/29 |
| 2013/0108263 A1 | 5/2013 | Srinivas et al. |
| 2013/0110675 A1* | 5/2013 | Bouw .................... G06Q 30/04 705/26.41 |
| 2013/0290945 A1* | 10/2013 | Sawal ................ H04Q 3/54516 717/168 |
| 2013/0311989 A1* | 11/2013 | Ota ..................... G06F 9/45558 718/1 |
| 2014/0068599 A1* | 3/2014 | Kannan ..................... G06F 8/61 718/1 |
| 2014/0101652 A1 | 4/2014 | Kamble et al. |
| 2014/0108988 A1* | 4/2014 | Datla .................... G06F 3/0484 715/772 |
| 2014/0109094 A1* | 4/2014 | Datla ........................ G06F 9/46 718/100 |
| 2014/0359558 A1 | 12/2014 | Chamberlain |
| 2015/0172117 A1* | 6/2015 | Dolinsky ............ H04L 41/0893 709/221 |
| 2015/0180714 A1 | 6/2015 | Chunn et al. |
| 2015/0193215 A1* | 7/2015 | Jianu ........................ G06F 8/61 717/177 |
| 2015/0319879 A1* | 11/2015 | Aimone ............... H05K 7/1498 235/375 |
| 2015/0350102 A1* | 12/2015 | Leon-Garcia ........... H04L 41/12 709/226 |

OTHER PUBLICATIONS

StarWind "Hyper-Converged with Software Defined Storage" Aug. 24, 2014, Resource Library White Papers pp. 1-7 Online link "https://www.starwindsoftware.com/resource-library/hyper-converged-with-software-defined-storage/" (Year: 2014).*

Marks, (Internet article: The Hyperconverged Infrastructure, dated Sep. 7, 2012, retrieved May 4, 2017, URL:http://www.networkcomputing.com/print/1233869).

"Iron Networks Inc.", (web article: IronPOD Turnkey Solution Overview Preconfigured Converged IaaS Infrastructure Platforms, dated 2013, retrieved Oct. 16, 2017, URL:https://web.archive.org/web/20131216194545/http://www.ironnetworks.com/MicrosoftConvergedInfrastructure).

* cited by examiner

1100

```
DEVELOP SOFTWARE, BY A FIRST PARTY, TO BE EXCLUSIVELY EXECUTED BY THE
PRE-CONFIGURED HYPER-CONVERGED COMPUTING DEVICE, WHEREIN
SOFTWARE COMPRISES A HYPERVISOR FOR MANAGING VIRTUAL MACHINES
HOSTED BY THE PRE-CONFIGURED HYPER-CONVERGED COMPUTING DEVICE
1110
```

```
DETERMINE A SECOND PARTY FOR BUILDING THE PRE-CONFIGURED
HYPER-CONVERGED COMPUTING DEVICE
1120
```

```
COLLABORATE BETWEEN THE FIRST PARTY AND THE SECOND PARTY TO
DETERMINE HARDWARE EFFICIENTLY SUITED TO EXCLUSIVELY EXECUTE THE
SOFTWARE, WHEREIN THE FIRST PARTY MAINTAINS AT LEAST SOME CONTROL
OVER THE SECOND PARTY FOR THE BUILDING THE PRE-CONFIGURED
HYPER-CONVERGED COMPUTING DEVICE SUCH THAT REVENUE IS ENHANCED
BY DECREASING TIME TO MARKET OF THE PRE-CONFIGURED
HYPER-CONVERGED COMPUTING DEVICE
1130
```

PROVIDE INSTRUCTIONS TO DISPLAY A SINGLE END-USER LICENSE AGREEMENT (EULA) TO ENABLE EXECUTION OF SOFTWARE ON THE PRE-CONFIGURED HYPER-CONVERGED COMPUTING DEVICE UPON ACCEPTANCE OF THE SINGLE EULA
1210

RECEIVE THE ACCEPTANCE OF THE SINGLE EULA BY A USER
1220

IN RESPONSE TO THE ACCEPTANCE OF THE SINGLE EULA, DEPLOY A FIRST VIRTUAL MACHINE IN A VIRTUALIZATION INFRASTRUCTURE SUPPORTED BY THE PRE-CONFIGURED HYPER-CONVERGED COMPUTING DEVICE SUCH THAT THE FIRST VIRTUAL MACHINE IS DEPLOYED IN A FIRST TIME FRAME RATHER THAN A LONGER SECOND TIME FRAME THAT INCLUDES ACCEPTING A PLURALITY OF EULAS
1230

TEST SOFTWARE UPDATES OF INSTALLED SOFTWARE ON AN UNDERLYING HARDWARE PLATFORM OF THE PRE-CONFIGURED HYPER-CONVERGED COMPUTING DEVICE BY A FIRST PARTY, WHEREIN THE INSTALLED SOFTWARE IS PROVIDED BY THE FIRST PARTY
1410

PROVIDE THE SOFTWARE UPDATES, BY THE FIRST PARTY, FOR THE UPDATING INSTALLED SOFTWARE ON THE PRE-CONFIGURED HYPER-CONVERGED COMPUTING DEVICE
1420

ENABLE INSTALLATION OF THE SOFTWARE UPDATES ON THE PRE-CONFIGURED HYPER-CONVERGED COMPUTING DEVICE SUCH THAT USER MANAGEMENT OF THE PRE-CONFIGURED HYPER-CONVERGED COMPUTING DEVICE IS DECREASED BASED ON THE SOFTWARE UPDATES PREVIOUSLY TESTED ON THE UNDERLYING HARDWARE PLATFORM
1430

PROVIDE SOFTWARE, BY A FIRST PARTY, FOR EXCLUSIVE EXECUTION ON THE PRE-CONFIGURED HYPER-CONVERGED COMPUTING DEVICE, WHEREIN THE SOFTWARE COMPRISES A HYPERVISOR
1510

PROVIDE HITLESS UPGRADING OF THE SOFTWARE ON THE PRE-CONFIGURED HYPER-CONVERGED COMPUTING DEVICE SUCH THAT USER MANAGEMENT OF THE PRE-CONFIGURED HYPER-CONVERGED COMPUTING DEVICE IS DECREASED BASED ON UNINTERRUPTING OF OPERATIONS OF THE PRE-CONFIGURED HYPER-CONVERGED COMPUTING DEVICE DURING THE HITLESS UPGRADING
1520

FIG. 15

DECREASING TIME TO DEPLOY A VIRTUAL MACHINE

CROSS-REFERENCE TO RELATED APPLICATIONS

This application claims priority to U.S. Provisional Patent Application 62/040,731, filed on Aug. 22, 2014, entitled "DECREASING TIME TO MARKET OF A PRE-CONFIGURED HYPER-CONVERGED COMPUTING DEVICE" by McDonough et al., and assigned to the assignee of the present application, hereby incorporated by reference in its entirety.

This application claims priority to U.S. Provisional Patent Application 62/040,742, filed on Aug. 22, 2014, entitled "DECREASING TIME TO DEPLOY A VIRTUAL MACHINE" by McDonough et al., and assigned to the assignee of the present application, hereby incorporated by reference in its entirety.

This application claims priority to U.S. Provisional Patent Application 62/040,758, filed on Aug. 22, 2014, entitled "DECREASING USER MANAGEMENT OF AN APPLIANCE," by McDonough et al., and assigned to the assignee of the present application, hereby incorporated by reference in its entirety.

This application is related to co-pending U.S. patent application 14/676,294, filed on Apr. 1, 2015, entitled "DECREASING TIME TO MARKET OF A PRE-CONFIGURED HYPER-CONVERGED COMPUTING DEVICE" by McDonough et al., and assigned to the assignee of the present application.

This application is related to co-pending U.S. patent application 14/676,348, filed on Apr. 1, 2015, entitled "DECREASING USER MANAGEMENT OF AN APPLIANCE," by McDonough et al., and assigned to the assignee of the present application.

BACKGROUND

In some virtual computing environments, the time period from conception of a pre-configured hyper-converged computing device (or appliance) to providing the pre-configured hyper-converged computing device (or appliance) to market may be prolonged. For example, disparate parties that provide different features and functionalities for the appliance typically take a prolonged time to reach a working agreement regarding what each party is responsible for in the development of the appliance. Moreover, the different parties may have different interests and goals from one another which may prolong the development of the appliance.

The prolonged nature of agreeing on determining a working relationship may delay the time to market of the appliance. As a result, the revenue of the appliance sold in the market place may be negatively affected due to the prolonged time to market of the appliance.

In other instances, the time period to set-up a pre-configured hyper-converged computing device upon purchase may be prolonged. For example, it may require hours to deploy a first virtual machine upon the first time powering up the appliance. In particular, it may take the customer specialized skills to understand the settings and parameters that may be required to provide to the appliance such that the appliance properly supports a virtualization infrastructure. Additionally, in conventional systems, there may be various software components from disparate parties. As a result, numerous license keys may be required to be entered to install/execute the software. Moreover, numerous EULAs may be required to be entered to install/execute the software. All of which prolong the time to set up the appliance and deploy the first virtual machine.

As a result, the burden on the customer to properly set-up the appliance prior to first deployment of a virtual machine may deter the customer from purchasing the appliance which would negatively affect the revenue to the software providers and/or the distributors of the appliance.

It should also be appreciated that creating and managing hosts and virtual machines may be complex and cumbersome. Oftentimes, a user, such as an IT administrator, requires a high level and complex skill set to effectively configure a new host to join the virtual computing environment. Additionally, it may be cumbersome for a user to manage software updates to a host. For example, a software update may negatively impact other software applications and/or the underlying hardware of a host.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 11 depicts a flow diagram for a method for enhancing revenue by decreasing time to market of a pre-configured hyper-converged computing device for supporting a virtualization infrastructure, according to various embodiments.

FIG. 12 depicts a flow diagram for a method for decreasing time to deploy a virtual machine hosted by pre-configured hyper-converged computing device, according to various embodiments.

FIG. 14 depicts a flow diagram for a method for decreasing user management of a pre-configured hyper-converged computing device, according to various embodiments.

FIG. 15 depicts a flow diagram for a method for decreasing user management of a pre-configured hyper-converged computing device, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

I. Various Embodiments of an Appliance and a Virtual Computing Environment

Figure 1:
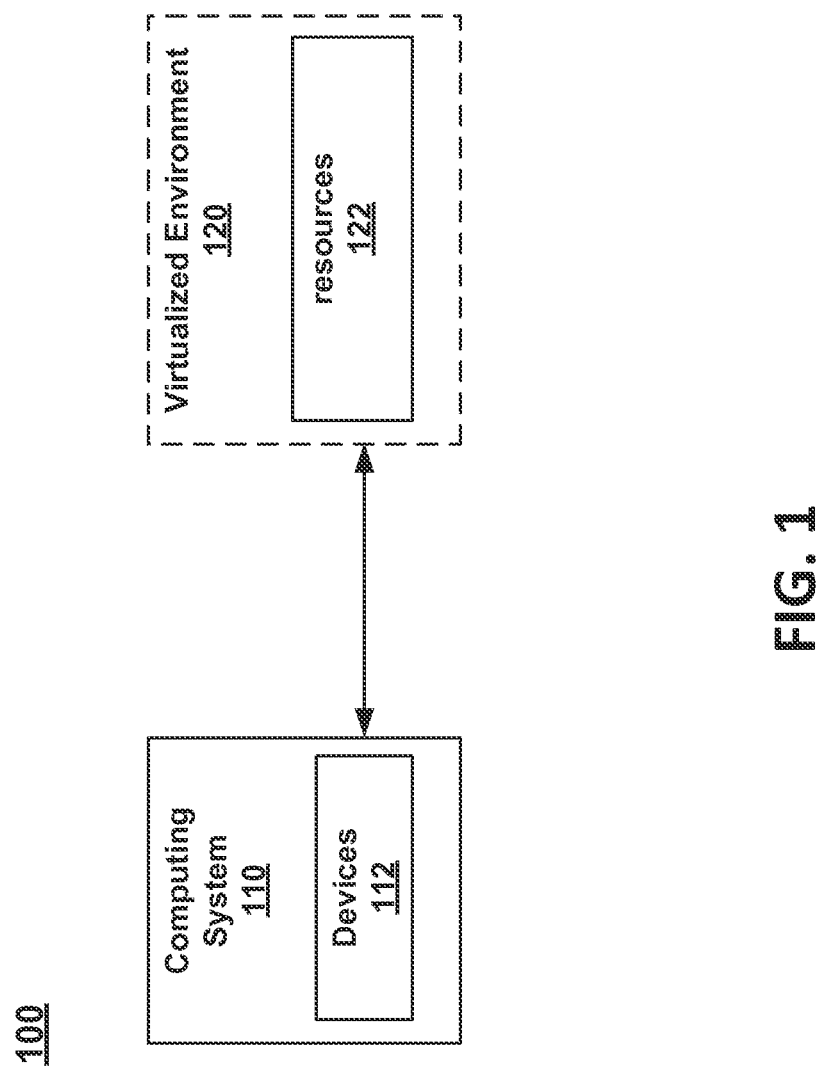
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
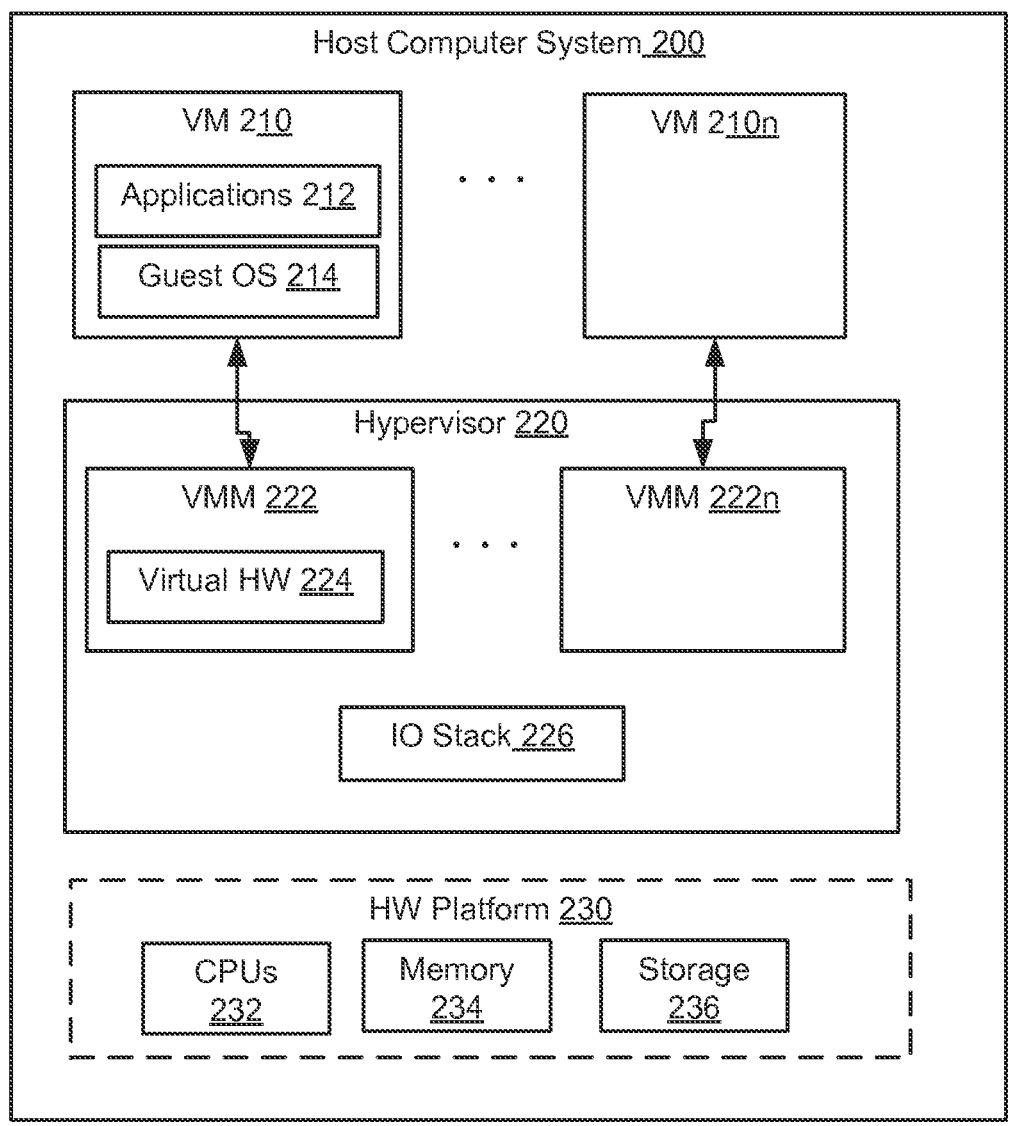
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
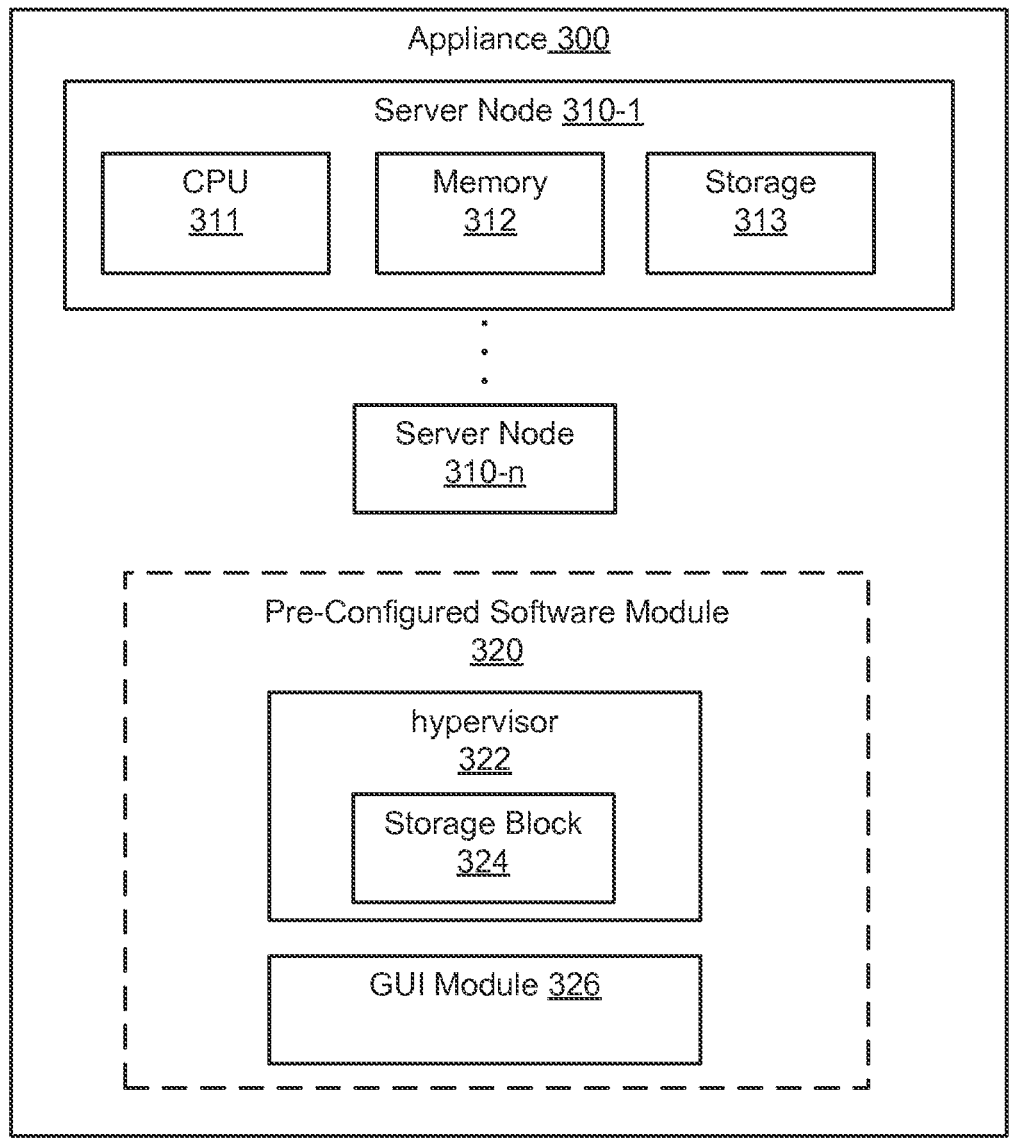
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1 U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™' VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
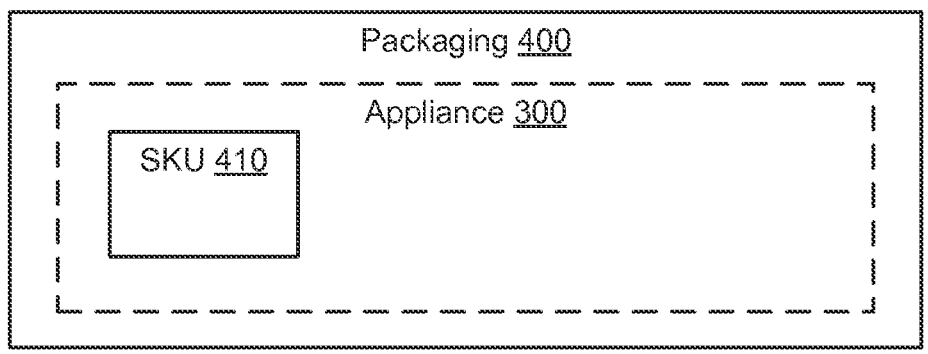
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
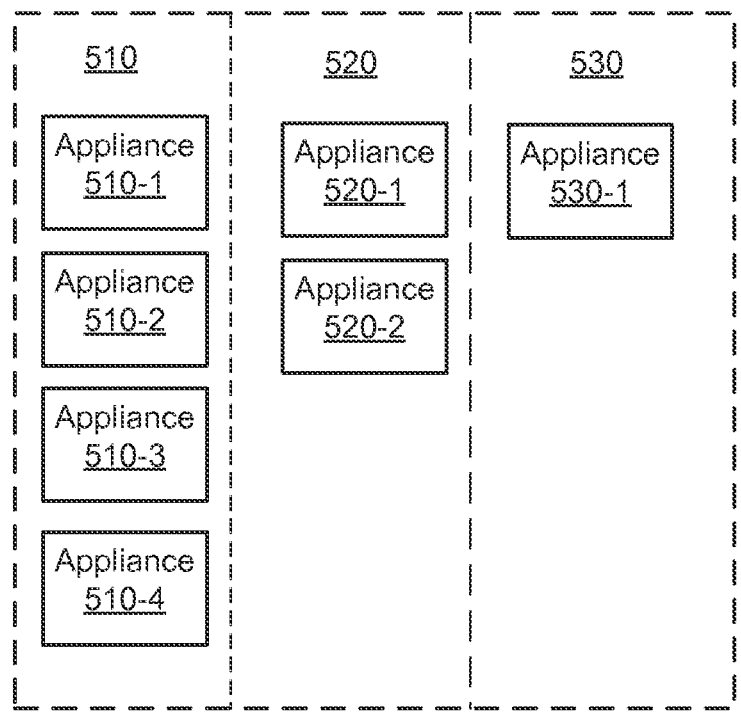
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Embodiments of Auto-Discovery of Appliances in a Network

Figure 6:
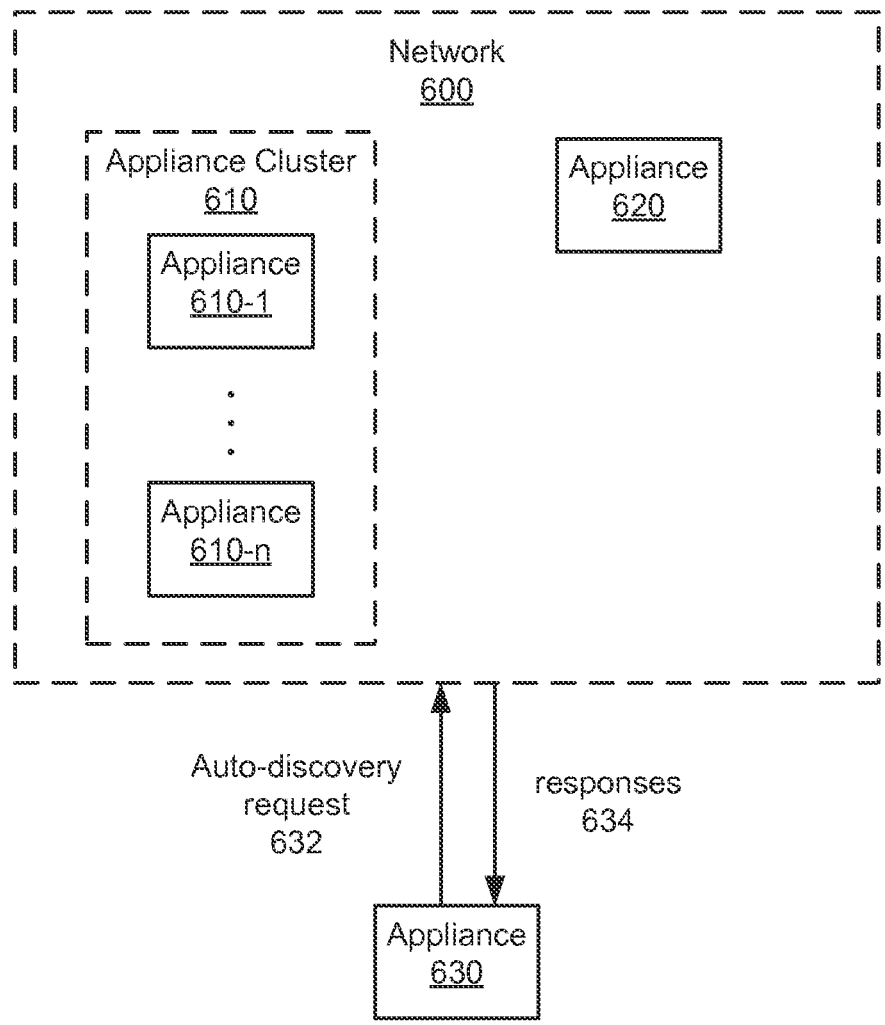
FIG. 6 depicts a block diagram of a virtualization infrastructure, according to various embodiments.

FIG. 6 depicts an embodiment of network 600 (or virtualization infrastructure).

Network 600 may include one or more appliances. For example, network 600 may include various appliances that are grouped together in a cluster and/or stand-alone.

Network 600, in one embodiment, includes appliance cluster 610 that includes appliances 610-1 through 610-n. Appliances 610-1 through 610-n are communicatively coupled and act as a single platform for managing the virtualization infrastructure and deploying virtual machines.

Additionally, network 600 may include stand-alone appliances such as appliance 620. Appliance 620 is independent to other clusters and other stand-alone appliances.

It is noted that appliances in network 600 (stand-alone appliances and/or clustered appliances) are authenticated and configured to function within network 600.

It may be desired that additional appliances are added to network 600 either as a stand-alone appliance or part of an existing appliance cluster to increase the functionality of the virtualization infrastructure. Moreover, the auto-discovery of other appliances that are authenticated and configured for use in the network is beneficial to the overall management of the appliances and network.

Referring still to FIG. 6, appliance 630 is intended to be added to network 600. Appliance 630 is initially communicatively coupled to network 600 (prior to being authenticated and configured to be included in network 600).

Appliance 630 automatically broadcasts an auto-discovery request 632 over network 600 to appliances within network 600 (e.g., appliances 610-1 through 610-n and appliance 620). The auto-discovery request by appliance 630 is provided by, but is not limited to, multicast Domain Name System (MDNS) broadcasting, or Domain Name System-Service Discovery (DNS-SD).

Appliance 630 may broadcast auto-discovery request 632 at various times during operation. For example, auto-discovery request 632 may be broadcasted upon initial powering on of appliance 630, during initial operation of appliance 630, or when appliance 630 is initially communicatively coupled to network 600 (but not authenticated or configured to operate within network 600.

Auto-discovery request 632 includes a service type. For example, request 632 includes a request for devices (or appliances) that are pre-configured hyper-converged computing devices. In one embodiment, the service type in request 632 is the same as the service type of appliance 630 (e.g., pre-configured hyper-converged computing device).

As will be described in further detail below, appliances have a unique identifier. The unique identifier includes the service type of the particular appliance. As such, in one embodiment, auto-discovery request 632 includes a portion of the unique identifier of the appliance.

Appliances within network 600 provide responses 634 to auto-discovery request 632 by appliance 630. Appliances in network 600 that receive the auto-discovery request may be required to respond to the auto-discovery request. In particular, the appliances having the same service type as the service type in auto-discovery request 632 provide responses 634.

If a stand-alone appliance, such as appliance 620, in network 600 receives the auto-discovery request then the stand-alone appliance provides a response. If appliances in a cluster receive the auto-discovery request, then one or more appliances in the cluster provide a response indicating that they are in a cluster of appliances.

Responses 634 are accessed by appliance 630 and indicate the appliances that are authenticated and configured to operate in network 600.

In one embodiment, responses 634 are obtained and displayed for viewing by a user, such as an IT administrator for network 600. The user may then select for appliance 630 to join a cluster, such as cluster 610, or join network 600 as a stand-alone appliance.

In another embodiment, appliance 630 may automatically decide to join a cluster, such as cluster 610, or join network 600 as a stand-alone appliance. The automatic decision may be based on which appliances in network 600 that are most similar to appliance 630.

Examples of an Appliance and Server Nodes with Unique Identifiers

A virtualization infrastructure, such as a datacenter, includes numerous hardware devices (e.g., appliances, routers, etc.). As a result, it is burdensome for administrators of the virtualization infrastructure to manage all of the components of the virtualization infrastructure. For example, if a server node of an appliance has a failure or error, it is very difficult to determine the location of the appliance in the virtualization infrastructure and which of the server nodes in the appliance has an error.

As will be described in further detail below, unique identifiers of a server node are correlated with a location of the server nodes in the appliance to facilitate in determining the exact location of the server nodes in the appliance.

Figure 7:
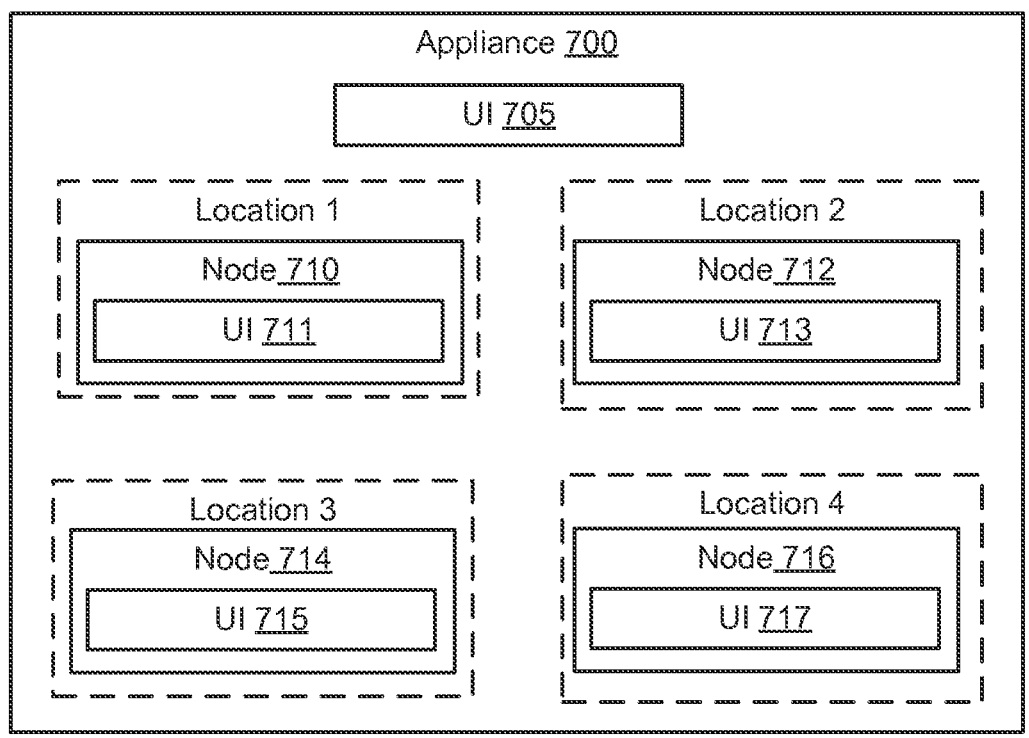
FIG. 7 depicts a block diagram of a pre-configured hyper-converged computing device, according to various embodiments.

FIG. 7 depicts an embodiment of a block diagram of appliance 700. The block diagram can be a front view or a back view of appliance 700.

Appliance 700 is a four node appliance. Accordingly, appliance 700 includes independent server node 710, independent server node 712, independent server node 714, and independent server node 716. It should be appreciated that, in various embodiments, appliance 700 can include less than four nodes or more than four nodes.

Appliance 700 includes unique identifier 705. Unique identifier 705 is any identifier that is unique to appliance 700.

Additionally, each server node includes a unique identifier. For example, independent server node 710 includes unique identifier 711, independent server node 712 includes unique identifier 713, independent server node 714 includes unique identifier 715, and independent server node 716 includes unique identifier 717. Unique identifiers of the server nodes are any identifier that are unique their respective independent server node.

Unique identifier 705 can include any information associated with the appliance 900 such as, but not limited to, manufacturing code, distribution code, supplier code, version, service type, and random information (e.g., random alphanumeric number).

Likewise, the unique identifier for each server node can include any information associated with the respective server node, such as, but not limited to, manufacturing code, distribution code, supplier code, version, service type, and random information (e.g., random alphanumeric number).

In one embodiment, unique identifier 705 includes information associated with server nodes that are a part of the appliance, such as, the unique identifiers of each server node.

Appliance 700 includes pre-defined locations for placement of independent server nodes. For example, appliance 700 includes location 1, location 2, location 3, and location 4. The designated locations correspond to the slots in which independent server nodes are disposed in appliance 700 and are communicatively coupled with appliance 900.

For example, independent server node 710 is located at location 1, independent server node 712 is located at location 2, independent server node 714 is located at location 3, and independent server node 716 is located at location 4.

In one embodiment, the locations are sequential. For example, location 1 through location 4.

In another embodiment, the locations are sequential in a pre-defined pattern. For example, the locations are sequentially numbered in a "Z" pattern. In particular, the pattern of locations 1 through 4 forms a "Z" pattern, where location 1 is at the left side of the upper row, location 2 is at the right side of the upper row, location 3 is at the left of the lower row, and location 4 is at the right of the lower row. It should be appreciated that sequence of locations 1 through 4 may provide a different pattern.

The unique identifier for each node is correlated with the location or position of the server node. For example, unique identifier 711 of server node 710 is correlated/associated with location 1, unique identifier 713 of server node 712 is correlated/associated with location 2, unique identifier 715 of server node 714 is correlated/associated with location 3, and unique identifier 717 of server node 716 is correlated/associated with location 4.

Based on the correlation, as described above, the exact location of the server node within the appliance is readily determined.

For instance, it is indicated that a server in a datacenter has failed. The failed server is identified as server node 710. Unique identifier 711 of server node 710 is correlated with location 1 of appliance 700. Based on the correlation, the exact location of server node 710 is determined to be in location 1 (e.g., upper left hand side of appliance 700). As a result, once appliance 700 is located, an IT administrator or the like is able to readily identify the failed server as being the server node in location 1 (e.g., upper left hand side) of appliance 700.

Examples of Authentication and Configuration of an Appliance in a Network

Figure 8:
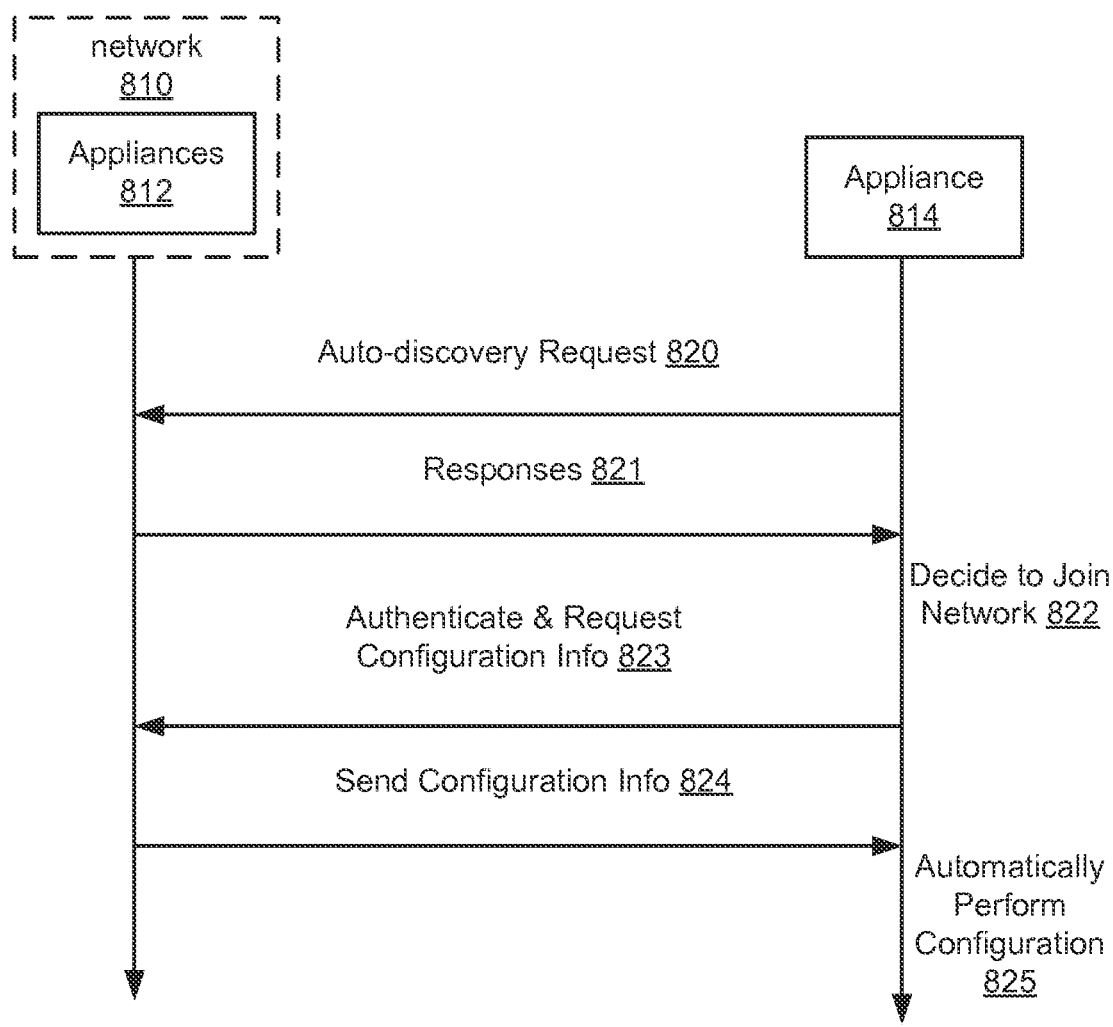
FIG. 8 depicts a flow diagram for a method for automatic network configuration of a pre-configured hyper-converged computing device, according to various embodiments.

FIG. 8 depicts a flow diagram 800 for a method for automatic configuration of an appliance. Network 810 includes appliances 812. Network 810 is similar to network 600, as described above. As such, appliances 1212 are similar to appliances in network 600. In particular, appliance 814 is similar to appliance 630 in that it is desired that appliance 814 is to be configured for network 810.

At 820, appliance 814 broadcasts an auto-discovery request to appliances 812 in network 810. The broadcast by appliance 814 is the same as the broadcast of appliance 630 described herein.

At 821, appliances 812 that receive the auto-discovery request provide responses to appliance 814. The responses are the same as responses 634 described herein.

At 822, it is decided that appliance 814 will join the network, either as a stand-alone appliance, joining an existing appliance cluster, or creating a new cluster with an existing stand-alone device.

At 823, appliance is authenticated with network 810 and appliance 814 requests network configuration information from appliances already configured in network 812. The configuration information can be any information the enables appliance 814 to be configured in network 810. For example, configuration information can be, but is not limited to, internet protocol (IP) addresses, virtual local area network identification (VLAN IDs), etc.

The authentication is any secured authentication protocol, such as an authentication that utilizes a shared key.

At 824, network configuration information is sent to appliance 814 from one or more appliances 812.

At 825, appliance 814 automatically performs the network configuration such that it is configured to be a part of network 810.

II. Various Embodiments of Decreasing Time to Market of a Pre-Configured Hyper-Converged Computing Device Conventionally, in some instances, the time period from conception of a pre-configured hyper-converged computing device (or appliance) to providing the pre-configured hyper-converged computing device (or appliance) to market may be prolonged. For example, disparate parties that provide different features and functionalities for the appliance typically take a prolonged time to reach a working agreement regarding what each party is responsible for in the development of the appliance. Moreover, the different parties may have different interests and goals from one another which may prolong the development of the appliance.

The prolonged nature of agreeing on determining a working relationship may delay the time to market of the appliance. As a result, the revenue of the appliance sold in the market place may be negatively affected due to the prolonged time to market of the appliance.

In contrast, as will be described in further detail below, a method is provided for enhancing revenue by decreasing time to market of a pre-configured hyper-converged computing device for supporting a virtualization infrastructure. For example, revenue is increased by reducing the time to market for a pre-configured hyper-converged computing device (e.g., appliance 300).

More specifically, for example, if a time to market is decreased, then revenue generated by the sale of the appliance increases because the appliance is on the market a longer time period and customers have additional time to purchase the appliance.

Figure 9:
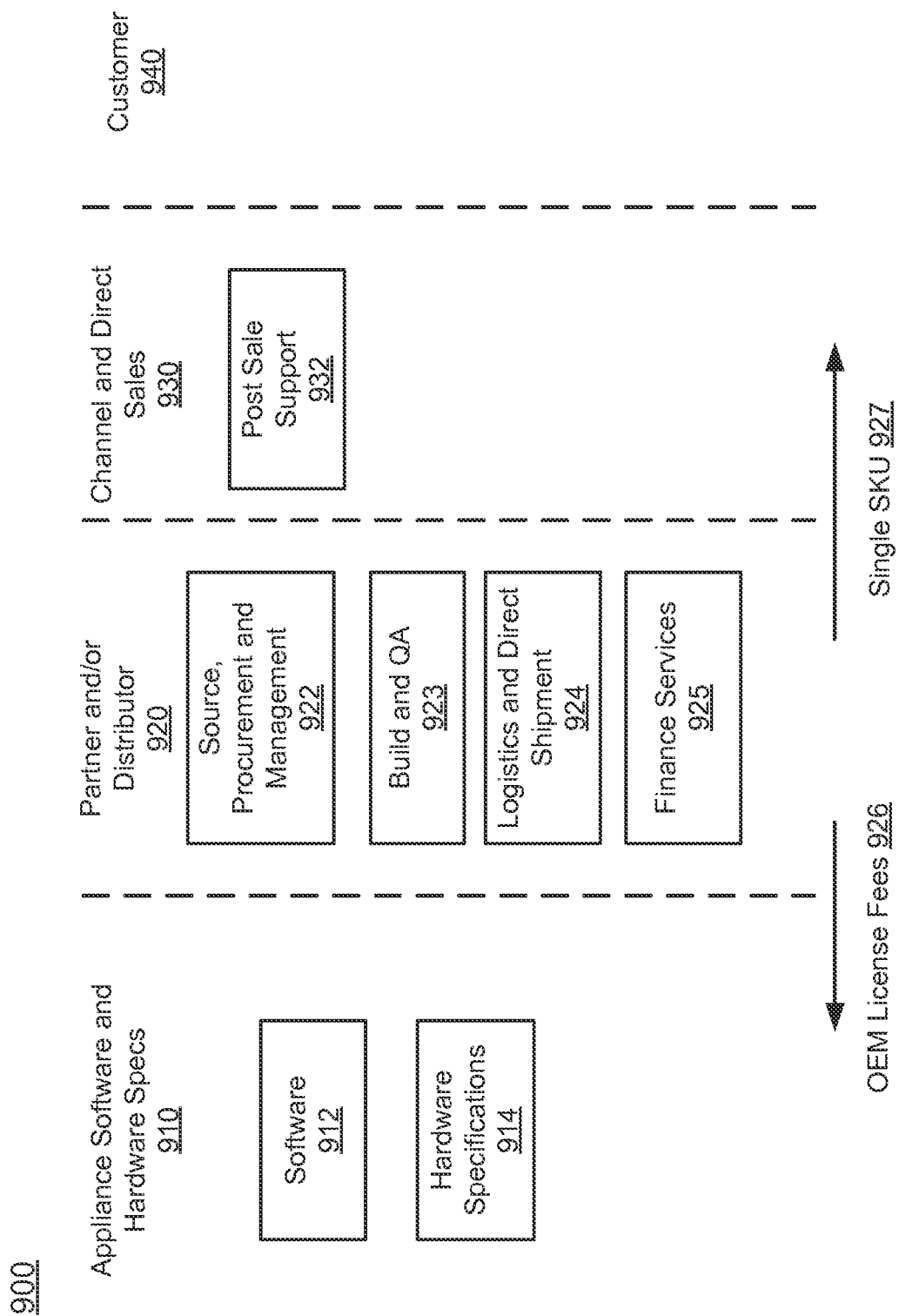
FIG. 9 depicts a block diagram of a business model, according to various embodiments.

FIG. 9 depicts a block diagram of a business model 900 of a relationship of parties involved in the development and building of a pre-configured hyper-converged computing device.

Portion 910 pertains to the appliance software and hardware specifications. For example, portion 910 includes software 912 that is developed for installation and execution on the appliance. In one embodiment, software 912 is the exclusive software to be installed and executed on the pre-configured hyper-converged computing device (e.g., appliance 300). That is, software 912 developed by a first party is the only software that installed and subsequently executed on the appliance.

Software 910, in one embodiment, is pre-configured software module 320 that includes, among other things, hypervisor 322, storage block 324 and GUI module 326. Software 910 can be any software that is executed on the appliance for the management of a virtualization infrastructure (e.g., virtualization infrastructure 500).

Additionally, portion 910 can include hardware specification 914. Hardware specifications 914 can be any specification that is developed that facilitates in determining an efficient and effectively underlying hardware for the appliance. The underlying hardware, in one embodiment, is the hardware for each server node (e.g., server node 310-1 through 310-n). Hardware specifications 914 can include any specification for a CPU, memory and/or storage (e.g., CPU 311, memory 312 and storage 313).

The software provider or developer of software 912 seeks out a business relationship with partner or distributor 920 to facilitate, among other things, building the appliance. The partner/distributor takes responsibility, in various degrees, for various steps in the process of building the appliance. The responsibilities are memorialized in a legal agreement between the software developer (e.g., first party) and the partner/distributor (e.g., second party).

In particular, the agreement provides that the partner builds the appliance such that the selected hardware meets hardware specifications 914 provided by the software developer.

Additionally, the partner and software developer collaborate with one another during the process of developing and building the appliance. For example, the software developer tests the hardware that is selected by the partner and tests such software on the selected hardware to determine if the hardware meets the hardware specifications and that the software runs as expected on the hardware.

Moreover, the software maintains some aspect of control over the partner during the building of the appliance. For example, the party that creates software 912 can instruct the partner that selects the hardware whether or not the hardware is approved.

In one embodiment, the partner/distributer provides for the source, procurement and management 922 of the hardware in the appliance. For example, the partner is responsible for finding the source of the hardware, procure the hardware and manages the purchase of the hardware for building the appliance.

The partner provides for the build and quality assurance 923 of the appliance. For example the partner builds the physical appliance with the software installed on the appliance. Additionally, the partner provides the resources to physically build the appliance at a factory and determine that the appliance meets quality assurance requirements.

The partner provides for the logistics and direct shipment 924 of the appliance. For example, the partner/distributor is responsible for the logistics of building the appliance and shipping the appliance, such as direct shipping through the distributor channels and direct sales.

The partner provides for the finance services. For example, the partner provides financing to customers who purchase the appliance. Additionally, the partner may lease the appliance to customers.

In one embodiment, the partner provides OEM license fees 926 to the developer of the software.

The appliance, as sold by the partner, is sold as a single SKU 927. The SKU can include the hardware provided by the partner, the software provided by the software provider and customer support.

Portion 930 is directed towards the sales channel (e.g., OEM channel) of the partner and direct sales of the partner. In particular, the partner provides post sale support 932 for the appliance.

For example, the partner handles the first and the second support calls from the customer (e.g., L1 and L2 support calls). Additionally, the software developer may provide support to the partner.

It should be appreciated that customer 940 purchases or leases the appliance through channel and direct sales of the partner.

As described above, business model 900 enables for a method for enhancing revenue by decreasing time to market of a pre-configured hyper-converged computing device for supporting a virtualization infrastructure.

More specifically, for example, if a time to market is decreased, then sales of the appliances may increase because the appliances are on the market for a longer time period and more appliances will be purchased due to the longer time period on the market (as compared to a shorter time period on the market due to an elongated time to market).

Example Methods of Operation

Figure 10:
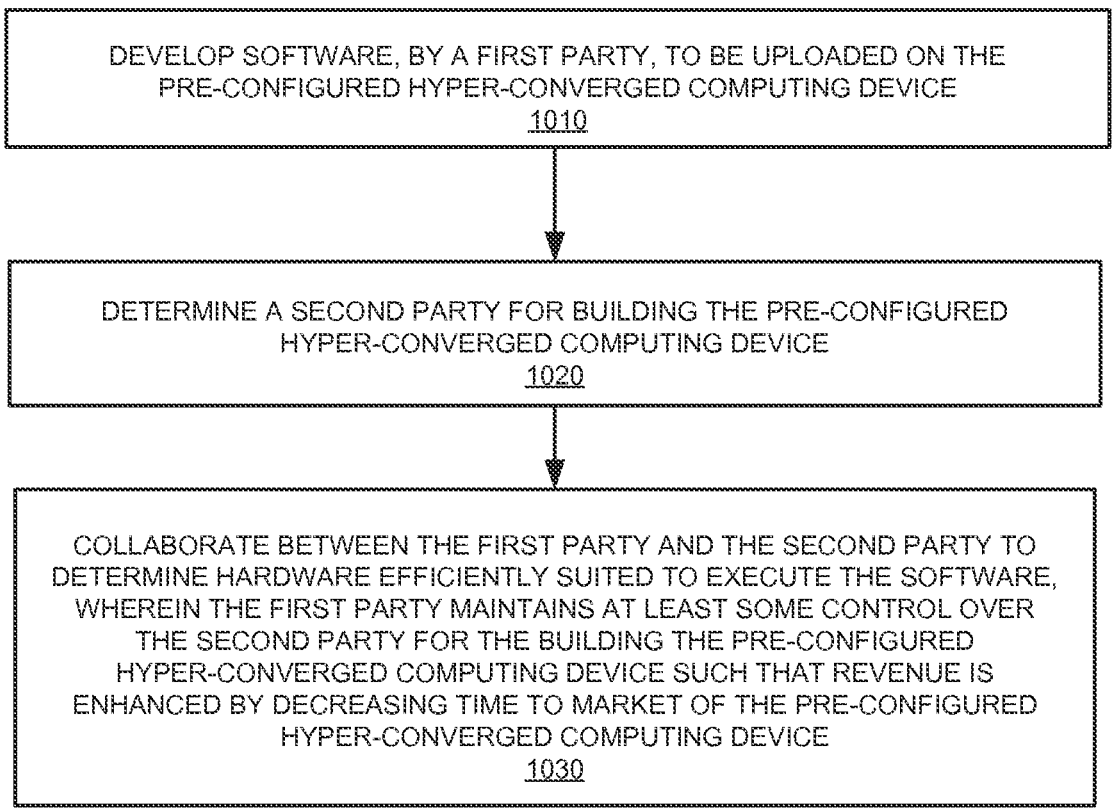
FIG. 10 depicts a flow diagram for a method for enhancing revenue by decreasing time to market of a pre-configured hyper-converged computing device for supporting a virtualization infrastructure, according to various embodiments.

The following discussion sets forth in detail the operation of some example methods of operation of embodiments. With reference to FIGS. 10 and 11, flow diagrams 1000 and 1100 illustrate example procedures used by various embodiments. Flow diagrams 1000 and 1100 include some procedures that, in various embodiments, may include some steps that are carried out by a processor under the control of computer-readable and computer-executable instructions. In this fashion, procedures described herein and in conjunction with flow diagrams 1000 and 1100 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1000 and 1100 such procedures are examples. That is, embodiments are well suited to performing various other procedures or variations of the procedures recited in flow diagrams 1000 and 1100. Likewise, in some embodiments, the procedures in flow diagrams 1000 and 1100 may be performed in an order different than presented and/or not all of the procedures described in one or more of these flow diagrams may be performed.

FIG. 10 depicts a process flow diagram 1000 of a method for a method for enhancing revenue by decreasing time to market of a pre-configured hyper-converged computing device for supporting a virtualization infrastructure, according to various embodiments.

At 1010, develop software, by a first party, to be uploaded on the pre-configured hyper-converged computing device. For example, a software company develops the exclusive software to be installed and executed on the pre-configured hyper-converged computing device.

At 1020, determine a second party for building the pre-configured hyper-converged computing device. For example, the software company finds another party, such as an electronic device distributor, to build the pre-configured hyper-converged computing device.

At 1030, collaborate between the first party and the second party to determine hardware efficiently suited to execute the software, wherein the first party maintains at least some control over the second party for the building the pre-configured hyper-converged computing device such that revenue is enhanced by decreasing time to market of the pre-configured hyper-converged computing device. For example, the software company and the distributor collaborate with one another to build the pre-configured hyper-converged computing device that will be sold in the marketplace.

Additionally, the software company assumes some control over the decision making that relates to building the pre-configured hyper-converged computing device.

As a result, revenue of the software company and the distributor are enhanced by decreasing time to market of the pre-configured hyper-converged computing device.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 of a method for a method for enhancing revenue by decreasing time to market of a pre-configured hyper-converged computing device for supporting a virtualization infrastructure, according to various embodiments.

At 1110, develop software, by a first party, to be exclusively executed by the pre-configured hyper-converged computing device, wherein software comprises a hypervisor for managing virtual machines hosted by the pre-configured hyper-converged computing device. For example, a software company develops the exclusive software to be installed and executed on the pre-configured hyper-converged computing device.

At 1120, determine a second party for building the pre-configured hyper-converged computing device. For example, the software company finds another party, such as an electronic device distributor, to build the pre-configured hyper-converged computing device.

At 1130, collaborate between the first party and the second party to determine hardware efficiently suited to exclusively execute the software, wherein the first party maintains at least some control over the second party for the building the pre-configured hyper-converged computing device such that revenue is enhanced by decreasing time to market of the pre-configured hyper-converged computing device. For example, the software company and the distributor collaborate with one another to build the pre-configured hyper-converged computing device that will be sold in the marketplace.

Additionally, the software company assumes some control over the decision making that relates to building the pre-configured hyper-converged computing device.

As a result, revenue of the software company and the distributor are enhanced by decreasing time to market of the pre-configured hyper-converged computing device It is noted that any of the procedures, stated above, regarding flow diagram 1100 may be implemented in hardware, or a combination of hardware with firmware and/or software. For example, any of the procedures are implemented by a processor(s) of a cloud environment and/or a computing environment.

III. Various Embodiments of Decreasing Time to Deploy a Virtual Machine

Conventionally, in some instances, the time period to set-up a pre-configured hyper-converged computing device upon purchase may be prolonged. For example, it may require hours to deploy a first virtual machine upon the first time powering up the appliance. In particular, it may take the customer specialized skills to understand the settings and parameters that may be required to provide to the appliance such that the appliance properly supports a virtualization infrastructure. Additionally, in conventional systems, there may be various software components from disparate parties. As a result, numerous license keys may be required to be entered to install/execute the software. Moreover, numerous EULAs may be required to be entered to install/execute the software. All of which prolong the time to set up the appliance and deploy the first virtual machine.

As a result, the burden on the customer to properly set-up the appliance prior to first deployment of a virtual machine may deter the customer from purchasing the appliance which would negatively affect the revenue to the software providers and/or the distributors of the appliance.

In contrast, as will be described in further detail below, a method is provided for enhancing revenue by decreasing time to deploy a virtual machine hosted by pre-configured hyper-converged computing device for supporting a virtualization infrastructure. For example, revenue is increased by reducing the time to first deployment of a virtual machine by a pre-configured hyper-converged computing device (e.g., appliance 300).

More specifically, for example, if the time to first deployment of a virtual machine (or time to value) is decreased, then the customer will be more willing to purchase the appliance as compared to an appliance that has a longer time to first deployment of a virtual machine. As a result, revenue is enhanced due to customers purchasing the appliance with a lower time to first deployment.

In various embodiments, displaying a single EULA decreases the time to first deployment of a virtual machine. For instance, upon powering on an appliance (e.g., appliance 300) for the first time, a single EULA is displayed to an end-user. Because the software installed in the appliance (e.g., software module 320 that includes hypervisor 322 and storage block 324) is proprietary to a single entity (e.g., VMware™), only a single EULA, provided by the single entity, is displayed to the purchasing end-user.

Upon acceptance of the EULA, the appliance is enabled to operate and manage a virtualization infrastructure, and deploy virtual machines in the virtualization infrastructure.

It should be appreciated that upon first powering on of the appliance and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In various embodiments, entering a single license key decreases the time to first deployment of a virtual machine. In general a license key (or product key) for a computer program certifies that the copy of the program is original. Activation is sometimes done offline by entering the key. In some instances, online activation is provided to prevent multiple people using the same key.

For instance, upon powering on an appliance (e.g., appliance 300) for the first time, a single license key is displayed to an end-user. Because the software installed in the appliance (e.g., software module 320 that includes hypervisor 322 and storage block 324) is proprietary to a single entity (e.g., VMware™), only a single license key is displayed to the purchasing end-user.

Upon entering the single license key, the appliance is enabled to operate and manage a virtualization infrastructure, and deploy virtual machines in the virtualization infrastructure.

Example Methods of Operation

Figure 13:
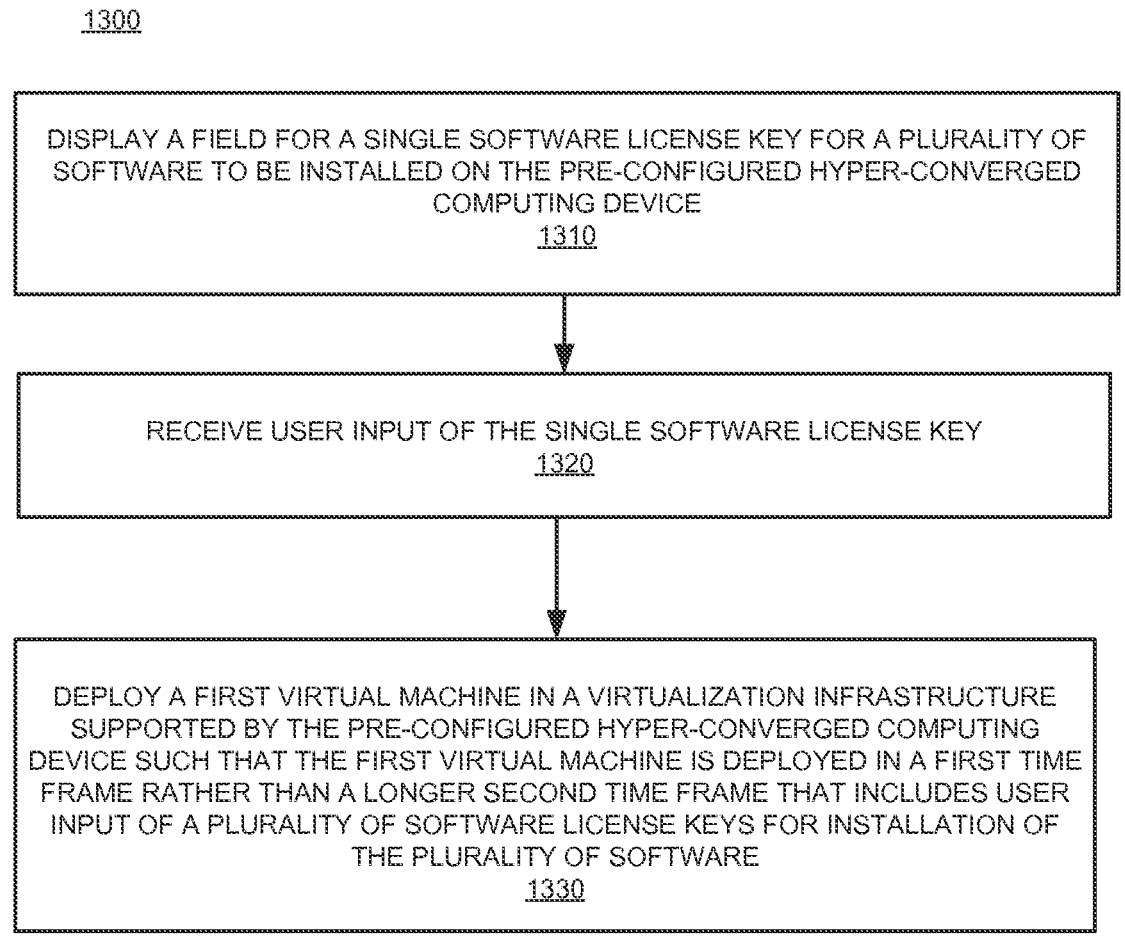
FIG. 13 depicts a flow diagram for a method for decreasing time to deploy a virtual machine hosted by pre-configured hyper-converged computing device, according to various embodiments.

The following discussion sets forth in detail the operation of some example methods of operation of embodiments. With reference to FIGS. 12 and 13, flow diagrams 1200 and 1300 illustrate example procedures used by various embodiments. Flow diagrams 1200 and 1300 include some procedures that, in various embodiments, may include some steps that are carried out by a processor under the control of computer-readable and computer-executable instructions. In this fashion, procedures described herein and in conjunction with flow diagrams 1200 and 1300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1200 and 1300 such procedures are examples. That is, embodiments are well suited to performing various other procedures or variations of the procedures recited in flow diagrams 1200 and 1300. Likewise, in some embodiments, the procedures in flow diagrams 1200 and 1300 may be performed in an order different than presented and/or not all of the procedures described in one or more of these flow diagrams may be performed.

FIG. 12 depicts a process flow diagram 1200 of a method for decreasing time to deploy a virtual machine hosted by pre-configured hyper-converged computing device, according to various embodiments.

At 1210, provide instructions to display a single end-user license agreement (EULA) to enable execution of software on the pre-configured hyper-converged computing device upon acceptance of the single EULA. For example, upon powering up an appliance, a single EULA is displayed for acceptance.

At 1220, receive the acceptance of the single EULA by a user. For example, a user accepts the single EULA.

At 1230, in response to the acceptance of the single EULA, deploy a first virtual machine in a virtualization infrastructure supported by the pre-configured hyper-converged computing device such that the first virtual machine is deployed in a first time frame rather than a longer second time frame that includes accepting a plurality of EULAs. For example, upon acceptance of the single EULA, a first virtual machine is deployed in the virtualization infrastructure supported by the appliance. As a result, the first virtual machine is deployed in a first time frame rather than a longer second time frame that includes accepting a plurality of EULAs.

It is noted that any of the procedures, stated above, regarding flow diagram 1200 may be implemented in hardware, or a combination of hardware with firmware and/or software. For example, any of the procedures are implemented by a processor(s) of a cloud environment and/or a computing environment.

FIG. 13 depicts a process flow diagram 1300 of a method for decreasing time to deploy a virtual machine hosted by pre-configured hyper-converged computing device, according to various embodiments.

At 1310, display a field for a single software license key for a plurality of software to be installed on the pre-configured hyper-converged computing device. For example, in one embodiment, upon initial powering on of the appliance, the software installed in the appliance requires user entry of a software license key in order for the software to properly execute on the appliance.

At 1320, receive user input of the single software license key. For example, the user provides a single license software key for each of the separate software packages installed on the appliance. Each of the separate software packages are provided by a single software provider.

At 1330, deploy a first virtual machine in a virtualization infrastructure supported by the pre-configured hyper-converged computing device such that the first virtual machine is deployed in a first time frame rather than a longer second time frame that includes user input of a plurality of software license keys for installation of the plurality of software. For example, in response to determining that the software is valid based on the provided single software license key, a first virtual machine is deployed by the appliance in the virtualization infrastructure. As a result, the first virtual machine is deployed in a first time frame rather than a longer second time frame that includes providing a plurality of software license keys for a plurality of software applications.

It is noted that any of the procedures, stated above, regarding flow diagram 1300 may be implemented in hardware, or a combination of hardware with firmware and/or software. For example, any of the procedures are implemented by a processor(s) of a cloud environment and/or a computing environment.

IV. Various Embodiments of Decreasing User Management of an Appliance

In conventional virtual computing environments, creating and managing hosts (e.g., ESX hosts) and virtual machines may be complex and cumbersome. Oftentimes, a user, such as an IT administrator, requires a high level and complex skill set to effectively configure a new host to join the virtual computing environment. Additionally, it may be cumbersome for a user to manage software updates to a host. For example, a software update may negatively impact other software applications and/or the underlying hardware of a host.

In contrast, a pre-configured hyper-converged computing device (e.g., appliance 300) as described herein, enables for low maintenance/management required by the user. For example, all of the software executing on the appliance is developed and owned by a single entity. Accordingly, if a software update is required then the software update is pre-tested by the single entity to ensure that performance of the software and/or hardware installed and executing on the appliance is not negatively affected by the software update.

In particular, the software company that owns the software implemented in the appliance may pre-test the software on a similar appliance to determine if there may be any issues with the update on other software applications and/or the underlying hardware in the appliance. If there are no issues with the update, then the update provided to the customer is pre-determined to cause no negative affects to the functionality of the appliance that is being updated. As a result, management by the user on the appliance is reduced.

Additionally, the pre-configured hyper-converged computing device may provide hitless upgrades. In general, a hitless upgrade enables for software updates to a device with little or no negative affects to the software currently running on the device.

For example, a workload of a first node may be offloaded to another node, while the first node is updated with software. Once updated, the first node may be brought back to service and the workload may be loaded back onto the first node.

Since all of the software installed on the appliance, including the hypervisor, is provided by a single entity, software updates to the appliance may be hitless.

Example Methods of Operation

The following discussion sets forth in detail the operation of some example methods of operation of embodiments. With reference to FIGS. 14 and 15, flow diagrams 1400 and 1500 illustrate example procedures used by various embodiments. Flow diagrams 1400 and 1500 include some procedures that, in various embodiments, may include some steps that are carried out by a processor under the control of computer-readable and computer-executable instructions. In this fashion, procedures described herein and in conjunction with flow diagrams 1400 and 1500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1400 and 1500 such procedures are examples. That is, embodiments are well suited to performing various other procedures or variations of the procedures recited in flow diagrams 1400 and 1500. Likewise, in some embodiments, the procedures in flow diagrams 1400 and 1500 may be performed in an order different than presented and/or not all of the procedures described in one or more of these flow diagrams may be performed.

FIG. 14 depicts a process flow diagram 1400 of a method for decreasing user management of a pre-configured hyper-converged computing device, according to various embodiments.

At 1410, test software updates of installed software on an underlying hardware platform of the pre-configured hyper-converged computing device by a first party, wherein the installed software is provided by the first party. For example, the first party that developed the software exclusively installed in the appliance pre-tests software updates on the installed software and the underlying hardware platform of the appliance.

At 1420, provide the software updates, by the first party, for the updating installed software on the pre-configured hyper-converged computing device. For example, if the first party determines that the software updates will not negatively affect the functionality of the appliance, then the party provides the updates to customers. The software updates may be automatically installed on the appliance or customers may download the updates from a repository.

At 1430, enable installation of the software updates on the pre-configured hyper-converged computing device such that user management of the pre-configured hyper-converged computing device is decreased based on the software updates previously tested on the underlying hardware platform. For example, the customer may provide instructions to have the software updates automatically installed on the appliance. As a result, the user management of the pre-configured hyper-converged computing device is decreased based on the software updates previously tested on the underlying hardware platform.

It is noted that any of the procedures, stated above, regarding flow diagram 1400 may be implemented in hardware, or a combination of hardware with firmware and/or software. For example, any of the procedures are implemented by a processor(s) of a cloud environment and/or a computing environment.

FIG. 15 depicts a process flow diagram 1500 of a method for decreasing user management of a pre-configured hyper-converged computing device, according to various embodiments.

At 1510, provide software, by a first party, for exclusive execution on the pre-configured hyper-converged computing device, wherein the software comprises a hypervisor. For example, a software provided provides the software that is exclusively installed and executed by the appliance.

At 1520, provide hitless upgrading of the software on the pre-configured hyper-converged computing device such that user management of the pre-configured hyper-converged computing device is decreased based on uninterrupting of operations of the pre-configured hyper-converged computing device during the hitless upgrading. For example, due to the hypervisor being a part of the exclusive software provided by a single party, workloads of a first node maybe offloaded to other nodes while the first node is brought off line and software updated on the first node. As a result, hitless upgrading of the software on the pre-configured hyper-converged computing device is provided such that user management of the pre-configured hyper-converged computing device is decreased based on uninterrupting of operations of the pre-configured hyper-converged computing device during the hitless upgrading.

It is noted that any of the procedures, stated above, regarding flow diagram 1500 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What we claim is:

1. A computer-implemented method for decreasing time to deploy a virtual machine hosted by pre-configured hyper-converged computing device for supporting a virtualization infrastructure, said method comprising:
    providing instructions to display a single end-user license agreement (EULA) to enable execution of a plurality of software owned by a single entity on said pre-configured hyper-converged computing device upon acceptance of said single EULA, said pre-configured hyper-converged computing device is a single rackable enclosure comprising:
        a plurality of independent server nodes able to independently host a number of virtual machines, each of said plurality of independent server nodes including a central processing unit (CPU), memory, and storage;
        pretested, pre-configured and pre-integrated storage, server and network components, including software, that are located in an enclosure; and
        a hypervisor that supports said virtualization infrastructure;
    receiving said acceptance of said single EULA by a user, said acceptance of said single EULA enabling said user to operate and manage said virtualization infrastructure, and deploy said virtual machine in said virtualization infrastructure via said pre-configured hyper-converged computing device;
    in response to said acceptance of said single EULA, deploying a first virtual machine in a virtualization infrastructure supported by said pre-configured hyper-converged computing device such that said first virtual machine is deployed in a first time frame rather than a longer second time frame that includes accepting a separate EULA for each of said plurality of software on said pre-configured hyper-converged computing device; and
    providing a hitless update for at least one software of said plurality of software on said pre-configured hyper-converged computing device and without requiring replication of said software on said underlying hardware platform of said pre-configured hyper-converged computing device.

2. The computer-implemented method of claim 1, wherein said a pre-configured hyper-converged computing device is offered for sale as a single stock keeping unit (SKU).

3. The computer-implemented method of claim 1, wherein said pre-configured hyper-converged computing device is a two rack unit-four node (2U/4N) device.

4. A computer-implemented method for decreasing time to deploy a virtual machine hosted by pre-configured hyper-converged computing device for supporting a virtualization infrastructure, said method comprising:
    displaying a field for a single software license key for a plurality of software owned by a single entity to be installed on said pre-configured hyper-converged computing device, said pre-configured hyper-converged computing device is a single rackable enclosure comprising:

a plurality of independent server nodes able to independently host a number of virtual machines, each of said plurality of independent server nodes including a central processing unit (CPU), memory, and storage;

pretested, pre-configured and pre-integrated storage, server and network components, including software, that are located in an enclosure; and a hypervisor that supports said virtualization infrastructure; receiving user input of said single software license key, said user input of said single software license key enabling said user to operate and manage said virtualization infrastructure, and deploy said virtual machine in said virtualization infrastructure via said pre-configured hyper-converged computing device;

deploying a first virtual machine in a virtualization infrastructure supported by said pre-configured hyper-converged computing device such that said first virtual machine is deployed in a first time frame rather than a longer second time frame that includes user input of a plurality of software license keys for installation of said plurality of software; and providing a hitless update for at least one software of said plurality of software on said pre-configured hyper-converged computing device and without requiring replication of said software on said underlying hardware platform of said pre-configured hyper-converged computing device.

5. The computer-implemented method of claim 4, wherein said a pre-configured hyper-converged computing device is offered for sale as a single stock keeping unit (SKU).

6. The computer-implemented method of claim 4, wherein said pre-configured hyper-converged computing device is a two rack unit-four node (2U/4N) device.

* * * * *